("US011022164B2")

(12) United States Patent
Roper et al.

(10) Patent No.: US 11,022,164 B2
(45) Date of Patent: Jun. 1, 2021

(54) DOUBLE SHELL FASTENER CAPS

(71) Applicant: The Boeing Company, Chicago, IL (US)

(72) Inventors: Christopher Stephen Roper, Oak Park, CA (US); Randall Colin Schubert, Santa Monica, CA (US); Eddie Kwon, Seattle, WA (US); Jason S. Damazo, Seattle, WA (US); Darrin M. Hansen, Seattle, WA (US); Mark Randall O'Masta, Oak Park, CA (US); Morgan A. Stilke, Port Hueneme, CA (US)

(73) Assignee: THE BOEING COMPANY, Chicago, IL (US)

( * ) Notice: Subject to any disclaimer, the term of this patent is extended or adjusted under 35 U.S.C. 154(b) by 219 days.

(21) Appl. No.: 16/209,088

(22) Filed: Dec. 4, 2018

(65) Prior Publication Data

US 2020/0080584 A1    Mar. 12, 2020

Related U.S. Application Data

(60) Provisional application No. 62/729,649, filed on Sep. 11, 2018.

(51) Int. Cl.
*F16B 37/14*     (2006.01)
*F16B 33/00*     (2006.01)
(Continued)

(52) U.S. Cl.
CPC ........ *F16B 33/004* (2013.01); *B29C 45/0001* (2013.01); *B64D 45/02* (2013.01);
(Continued)

(58) Field of Classification Search
CPC ......... F16B 37/14; F16B 33/004; B64D 45/02
(Continued)

(56) References Cited

U.S. PATENT DOCUMENTS 2,173,046 A    9/1939   Smith
3,351,214 A    11/1967  Herbert
(Continued)

FOREIGN PATENT DOCUMENTS

CA    2856687A A1    3/2015
CA     2858461 A1    3/2015
(Continued)

OTHER PUBLICATIONS

PRC-Desoto International, Inc., "Technical Data Sheet Aerospace Sealants Customized Sealant Solutions PRC(R) Seal Caps," May 1, 2017, Lit, #4086, Sylmar, CA, pp. 1-2; retrieved on Dec. 4, 2018, retrieved from internet: http://www.ppgaerospace.com/getmedia/9a234ec3-1db9-48de-94f7-c212ac2ba705/SealCapFlyer.pdf.aspx.
(Continued)

*Primary Examiner* — Flemming Saether
(74) *Attorney, Agent, or Firm* — Coats & Bennett, PLLC

(57) ABSTRACT

A cover that extends over a fastener and methods of installing the cover over the fastener. The cover includes an open end positioned at a member from which the fastener extends. The cover also includes a closed end that extends over the fastener and shields the fastener from the exterior environment that can be combustible. The cover includes an outer shell with one or more windows. An inner shell is positioned within the outer shell. The inner shell includes one or more windows that are offset from the windows of the outer shell. One or more flow paths extend through the windows for gas, liquid, and/or some particles to flow through the cover while removing the thermal and/or kinetic energy that may ignite the combustible exterior environment.

20 Claims, 12 Drawing Sheets

(51) Int. Cl.
  *B29C 45/00* (2006.01)
  *B64D 45/02* (2006.01)
  *B29K 27/18* (2006.01)
  *B29K 71/00* (2006.01)
  *B29L 31/34* (2006.01)
  *B29L 31/00* (2006.01)

(52) U.S. Cl.
  CPC .......... *F16B 37/14* (2013.01); *B29K 2027/18* (2013.01); *B29K 2071/00* (2013.01); *B29L 2031/3412* (2013.01); *B29L 2031/727* (2013.01)

(58) Field of Classification Search
  USPC .............................................. 411/372.5–377
  See application file for complete search history.

(56) References Cited

U.S. PATENT DOCUMENTS

| | | | |
|---|---|---|---|
| 3,470,787 A * | 10/1969 | Mackie | F16B 33/004 |
| | | | 411/377 |
| 4,519,974 A | 5/1985 | Bravenec et al. | |
| 4,636,446 A | 1/1987 | Lee | |
| 4,820,097 A | 4/1989 | Maeda et al. | |
| 4,826,380 A | 5/1989 | Henry | |
| 5,108,853 A | 3/1992 | Feres | |
| 5,749,690 A | 5/1998 | Kutz | |
| 5,890,859 A | 4/1999 | Hasnik | |
| 6,425,720 B1 * | 7/2002 | Kramer | F16B 37/14 |
| | | | 411/372.5 |
| 7,172,381 B2 | 2/2007 | Miyazaki | |
| 8,717,736 B2 | 5/2014 | Asahara et al. | |
| 9,188,226 B2 | 11/2015 | Pajel et al. | |
| 9,228,604 B2 | 1/2016 | Dobbin | |
| 9,744,923 B2 | 8/2017 | Parenti | |
| 9,951,804 B2 | 4/2018 | Dobbin et al. | |
| 10,040,568 B2 | 8/2018 | Rebbeck et al. | |
| 10,415,623 B2 * | 9/2019 | Dobbin | B64D 45/02 |
| 10,501,202 B2 | 12/2019 | Roper et al. | |
| 2010/0322782 A1 * | 12/2010 | Welch | F02C 7/04 |
| | | | 416/244 R |
| 2011/0123293 A1 | 5/2011 | Matlock et al. | |
| 2012/0217673 A1 | 8/2012 | Huffer, III | |
| 2013/0223951 A1 * | 8/2013 | Bessho | B64D 45/02 |
| | | | 411/337 |
| 2014/0048198 A1 | 2/2014 | Dobbin et al. | |
| 2014/0341675 A1 | 11/2014 | Dobbin | |
| 2015/0082603 A1 | 3/2015 | Rawdon et al. | |
| 2015/0086295 A1 | 3/2015 | Cameron et al. | |
| 2015/0271960 A1 | 9/2015 | Yoon et al. | |
| 2016/0230801 A1 | 8/2016 | Dobbin et al. | |
| 2020/0080585 A1 * | 3/2020 | Roper | F16B 33/004 |
| 2020/0149580 A1 | 5/2020 | Abou Halima et al. | |

FOREIGN PATENT DOCUMENTS

| | | |
|---|---|---|
| CN | 105179432 A | 12/2015 |
| EP | 2860410 A1 | 4/2015 |
| GB | 1492206 A | 11/1977 |

OTHER PUBLICATIONS

Porex Corporation, "Porex(R) Battery Vents—Flame Arrestors," Porex Advanced Porous Materials, PXT-621-080513-00, Jan. 1, 2013, pp. 1-2, retrieved on Dec. 4, 2018, retrieved from internet: http://www.porex.com/files/documents/POREX-Battery-Vents---Letter-for-Web.pdf.

EP Search Report dated Jan. 30, 2020 in re EP Application No. 1919573.1.

EP Search Report dated Feb. 7, 2020 in re EP Application No. 19195734.9.

* cited by examiner

DOUBLE SHELL FASTENER CAPS

This application claims priority from U.S. Provisional App. No. 62/729,649, filed 11 Sep. 2018, the disclosure of which is incorporated by reference herein in its entirety.

TECHNOLOGICAL FIELD

The present disclosure relates generally to devices and methods for quenching ignition and, more specifically, to a cover and methods of positioning the cover over a fastener to quench ignition.

BACKGROUND

In the aerospace industry, lightning strikes of aircraft are a concern because they could result in electrical arcs, vaporized materials creating hot gas, and/or heating sufficient to ignite vaporous fuel mixtures. Though lightning normally passes through an aircraft without resulting harm, newer aircraft designs incorporate composite materials with less metal and conductors to shunt and/or dissipate the energy of a lightning strike.

During a lightning strike on an aircraft, a high electrical current may propagate through conductive paths on the aircraft. Due to the non-isotropic electrical conduction of composite materials used in certain aircraft designs and potentially poor electrical connection at panel interfaces, the electrical current can pass through a fastener when propagating from one composite panel to another. While passing through a fastener, the current may generate electromagnetic effects, such as electrical arcs, hot gas, and/or hot particles, that may interact with combustible fuel vapor (in the absence of safety measures). Such an uncontained emission of energy may pose an ignition risk to aircraft fuel tanks. In a typical commercial aircraft, hundreds to thousands of fasteners can extend into the fuel tank, and each should be configured to prevent ignition in the event of a lightning strike.

As a safety measure, the fasteners can be covered with polysulfide cap seals to seal fuel mixtures in a fuel tank from any arcs, hot gas, or hot particles that may form as a result of a lightning strike. However, these caps require an airtight seal that remains intact during the lightning strike to be effective. Without an airtight seal, fuel may contact the fastener and/or the arc, hot gas, or hot particles can bypass the unsealed cap to present an ignition risk. Additionally, environmental exposure (e.g., thermal cycling) and/or electromagnetic effects at the fastener can damage the seal. Achieving a resilient, airtight seal is a labor-intensive process that may need to be repeated thousands of times per aircraft. The associated installation time as well as inspection time increase the cost and production time of aircraft.

SUMMARY

One aspect is directed to a cover that includes an inner shell with a first end that is open, a second end, and an interior space sized to extend over a fastener. The inner shell has a window open to the interior space and positioned between the first end and the second end. An outer shell shrouds the inner shell. The outer shell includes a first end that is open and a second end. The outer shell further includes a window positioned between the open end and the second end. The window of the outer shell is aligned away from the window of the inner shell to prevent a line of sight from an exterior of the outer shell to the interior space of the inner shell. A gap is positioned between the inner shell and the outer shell. A flow path extends between the interior space of the inner shell and the exterior of the outer shell. The flow path extends to and through the window of the inner shell, the window of the outer shell, and the gap.

One aspect is directed to a cover with an inner shell and an outer shell that are nested together in an overlapping arrangement that includes an open end and a closed end. Each of the inner shell and the outer shell include: a first end that is open; an interior space; at least one window in communication with the respective interior space; and a second end that opposes the respective first end. The cover includes one or more gaps between the outer shell and the inner shell. At least one flow path extends outward from an interior space within the inner shell to an exterior of the outer shell. Each of the at least one flow paths extends through at least one of the windows of the inner shell, at least one of the windows of the outer shell, and one of the one or more gaps that extend between the windows.

One aspect is directed to a method of installing a cover over a fastener. The method includes positioning a cover over a fastener that extends from a member with the fastener positioned in an interior space of an inner shell and with an outer shell extending over the inner shell. The method includes aligning the cover over the fastener with a window through the outer shell being misaligned with a window of the inner shell and preventing the fastener from being visible from an exterior of the outer shell of the cover. The method includes aligning the inner shell relative to the outer shell and forming a flow path that extends from the interior space of the inner shell to the exterior of the outer shell. The flow path extends through the window of the inner shell, along a gap formed between the inner shell and the outer shell, and through the window of the outer shell.

The features, functions and advantages that have been discussed can be achieved independently in various aspects or may be combined in yet other aspects, further details of which can be seen with reference to the following description and the drawings.

BRIEF DESCRIPTION OF THE DRAWINGS

Figure 1:
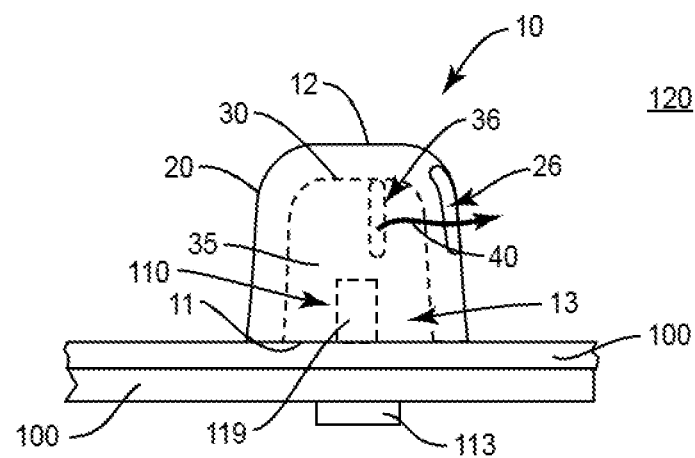

Having thus described variations of the disclosure in general terms, reference will now be made to the accompanying drawings, which are not necessarily drawn to scale, and wherein:

FIG. 1 is a side view of a cover extending over a fastener that is attached to a member and a shrouded inner shell shown in dashed lines in accordance with an embodiment.

Figure 2A:
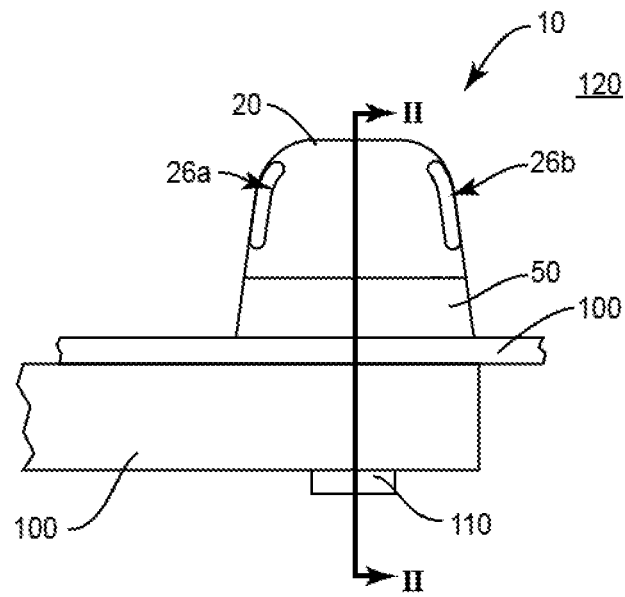

FIG. 2A is a side view of a cover extending over a fastener that is attached to a member in accordance with an embodiment.

Figure 2B:
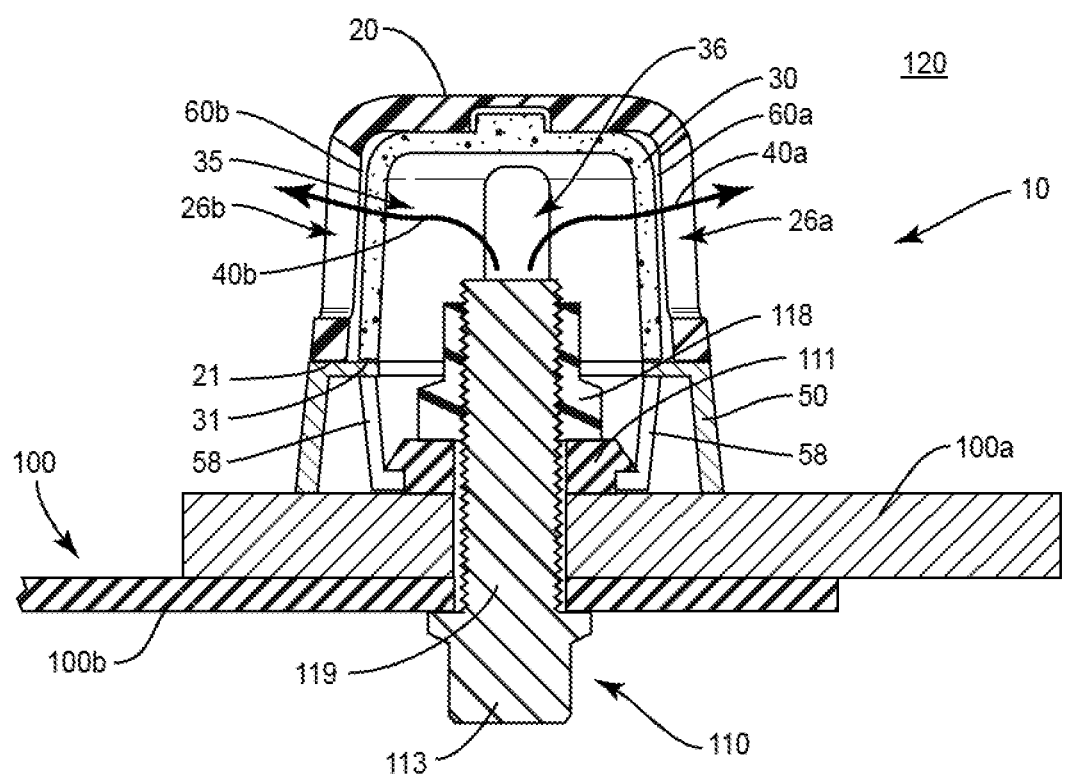

FIG. 2B is a section view of the cover of FIG. 2A cut along line II-II.

Figure 3:
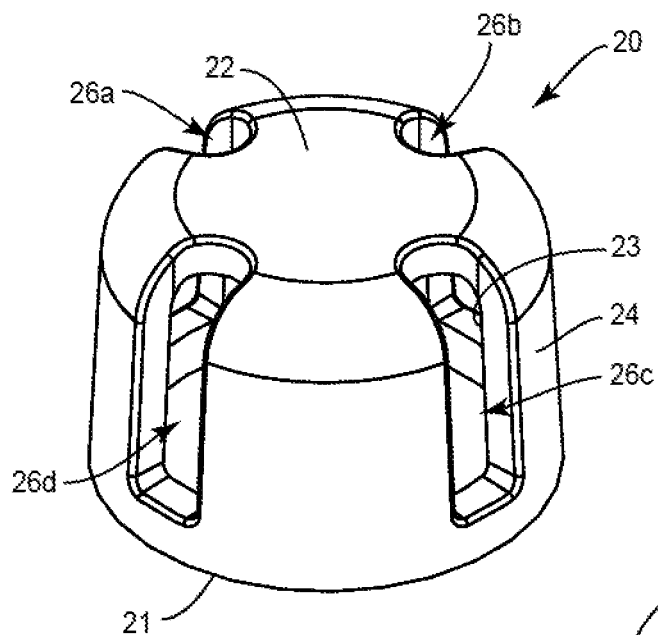

FIG. 3 is a perspective view of an outer shell in accordance with an embodiment.

Figure 4:
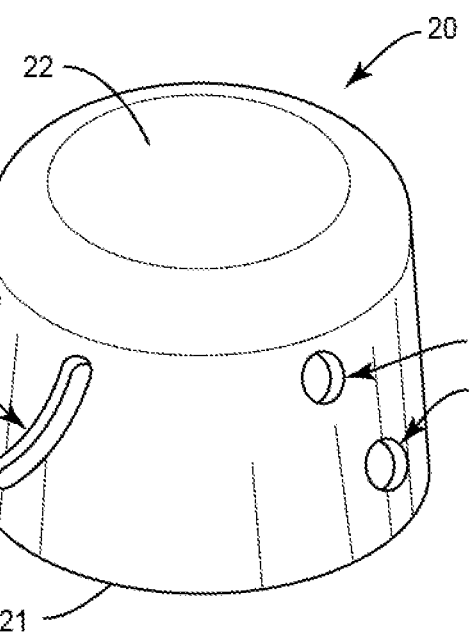

FIG. 4 is a perspective view of an outer shell in accordance with an embodiment.

Figure 5:
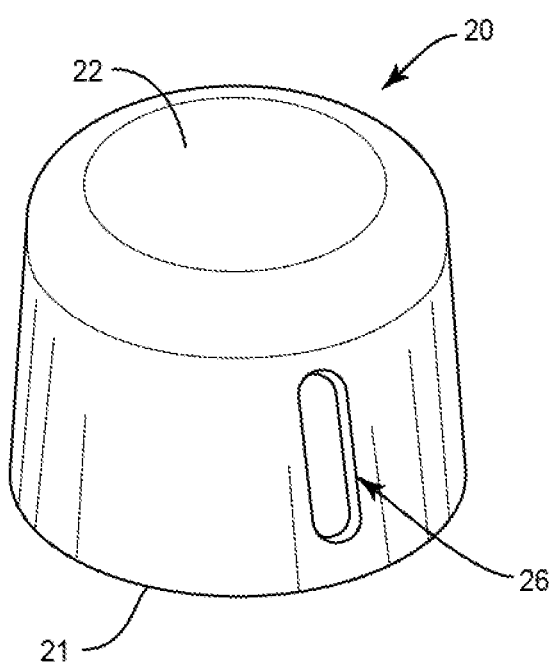

FIG. 5 is a perspective view of an outer shell in accordance with an embodiment.

Figure 6:
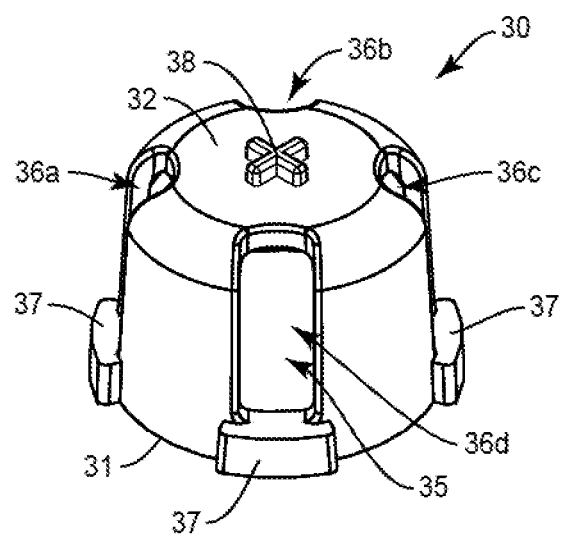

FIG. 6 is a perspective view of an inner shell in accordance with an embodiment.

Figure 7:
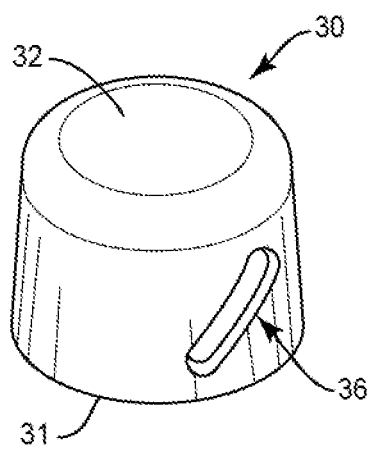

FIG. 7 is a perspective view of an inner shell in accordance with an embodiment.

Figure 8:
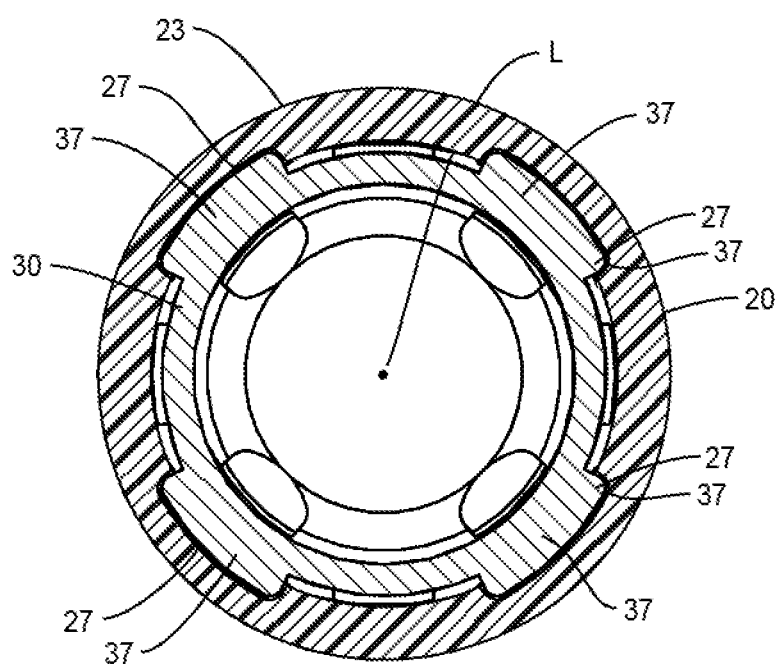

FIG. 8 is a section view of an inner shell positioned within an outer shell in accordance with an embodiment.

Figure 9:
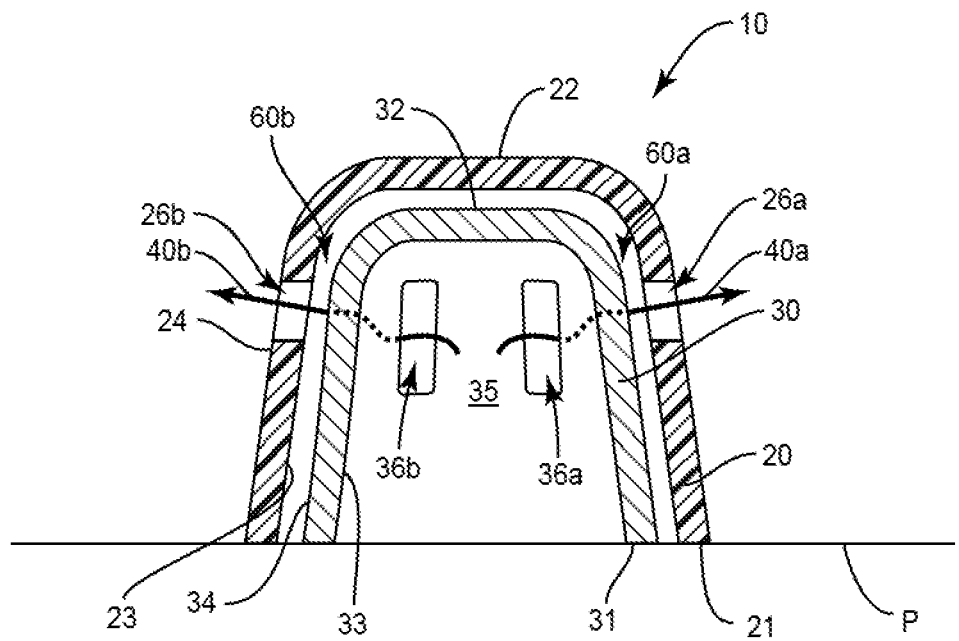

FIG. 9 is a side section view of a cover that includes a gap between an inner shell and an outer shell in accordance with an embodiment.

Figure 10:
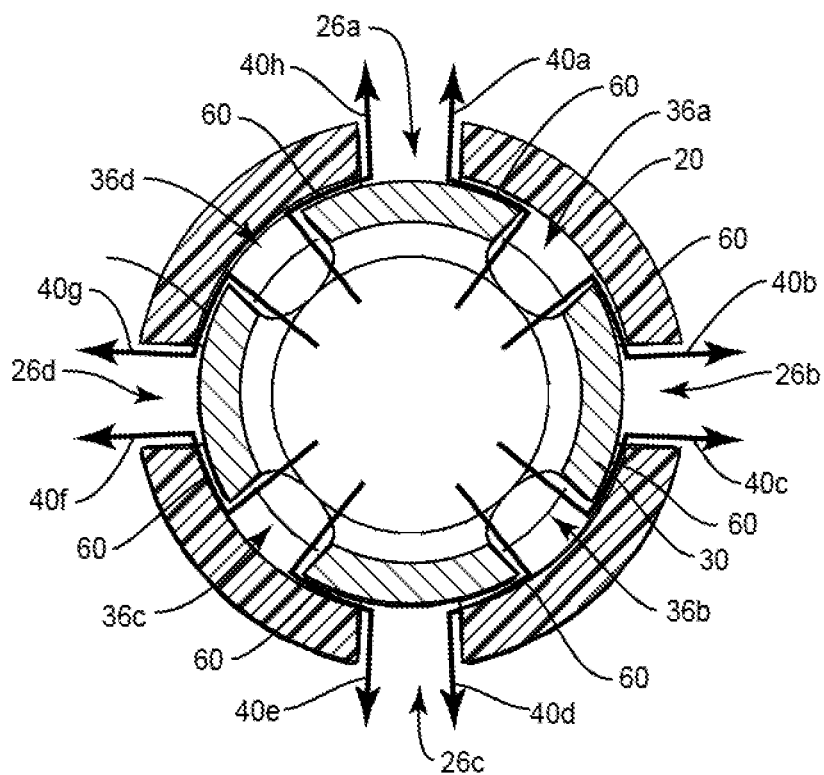

FIG. 10 is a section view of an inner shell positioned within an outer shell and flow paths that lead from the interior space in accordance with an embodiment.

Figure 11:
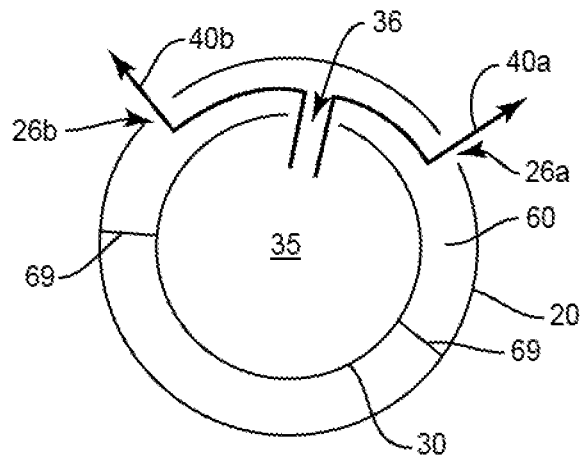

FIG. 11 is a schematic view of flow paths that extend through a cover in accordance with an embodiment.

Figure 12:
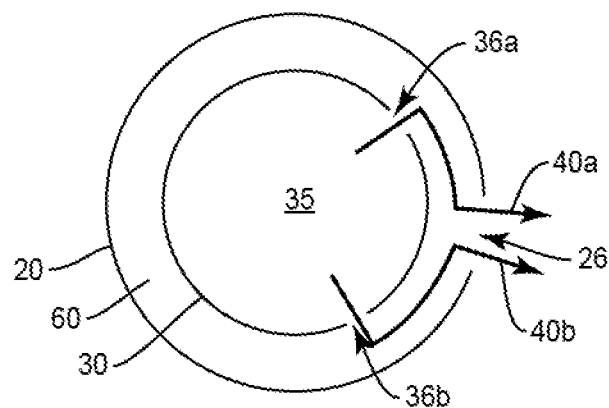

FIG. 12 is a schematic view of flow paths that extend through a cover in accordance with an embodiment.

Figure 13:
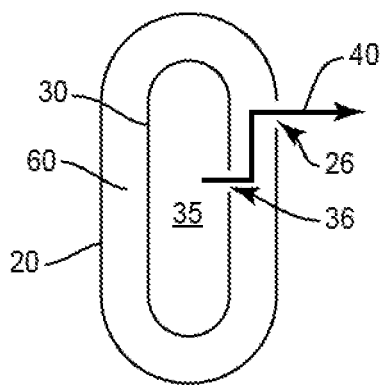

FIG. 13 is a schematic view of a flow path that extends through a cover in accordance with an embodiment.

Figure 14:
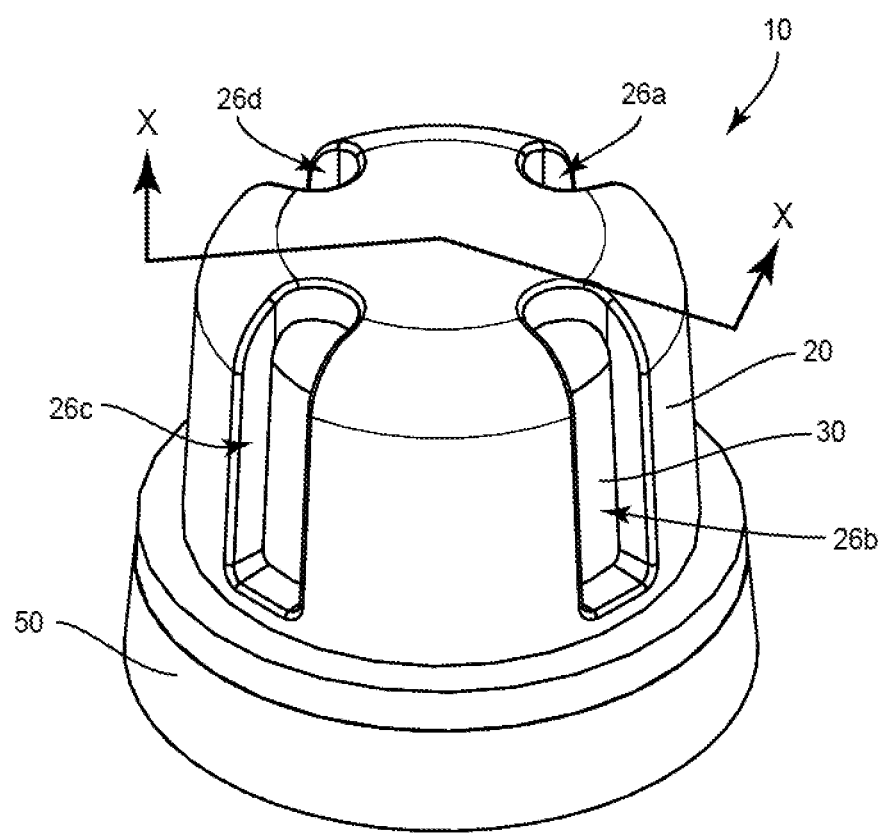

FIG. 14 is a perspective view of a cover in accordance with an embodiment.

Figure 15:
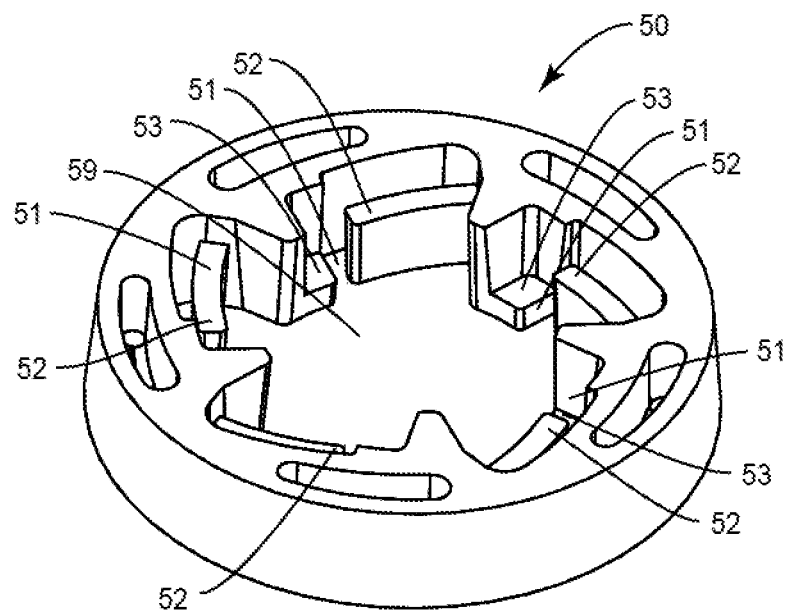

FIG. 15 is a perspective view of a base of the cover of FIG. 14 in accordance with an embodiment.

Figure 16:
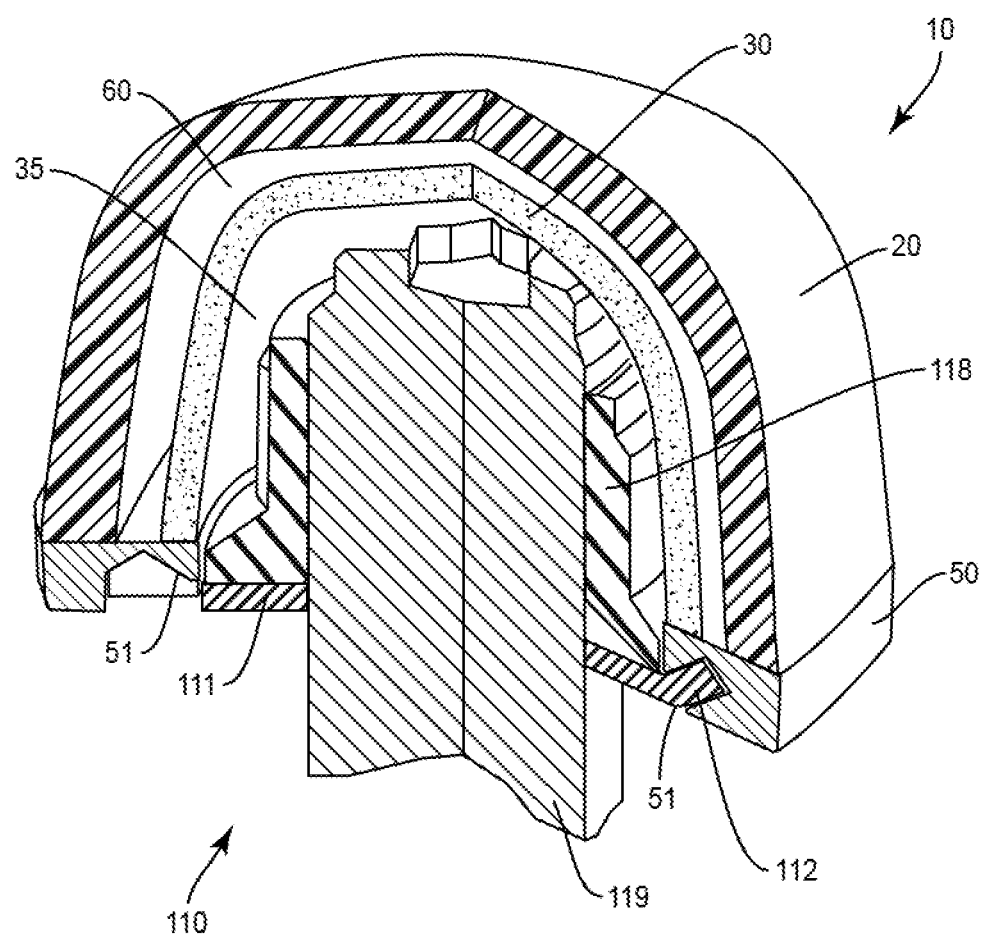

FIG. 16 is a section view cut along line X-X of FIG. 14.

Figure 17:
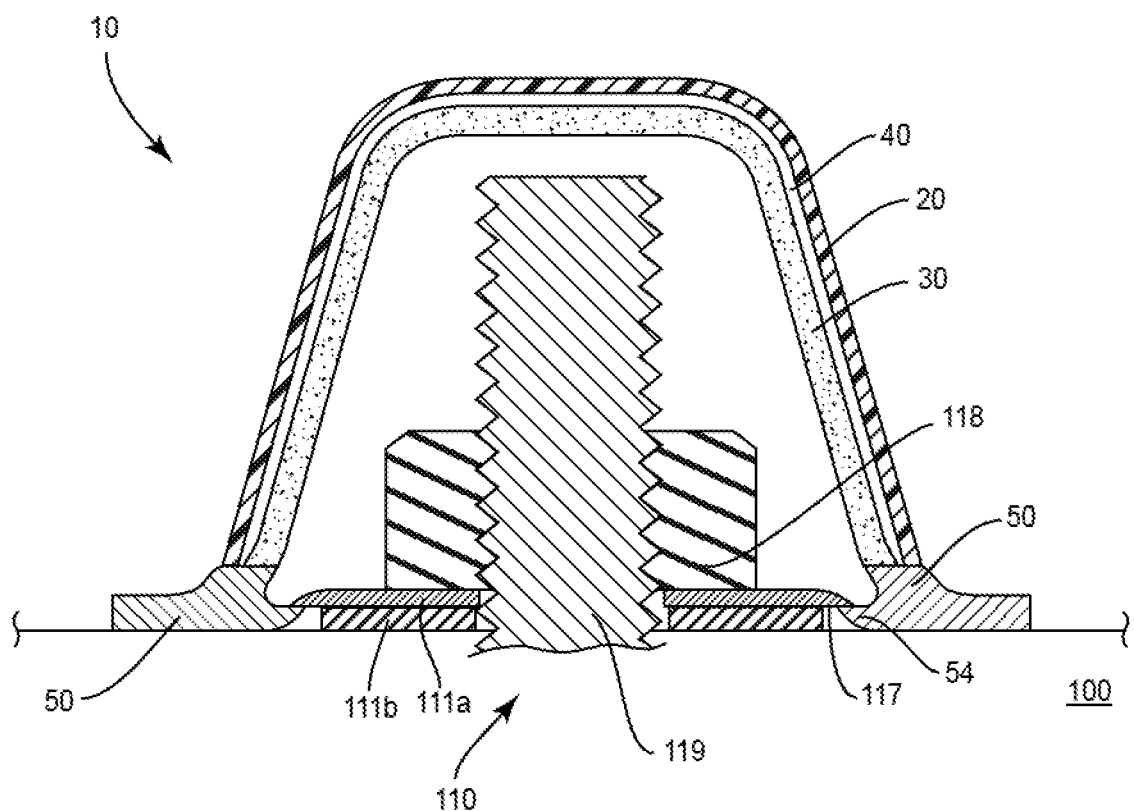

FIG. 17 is a section view of a cover that extends over a fastener in accordance with an embodiment.

Figure 18:
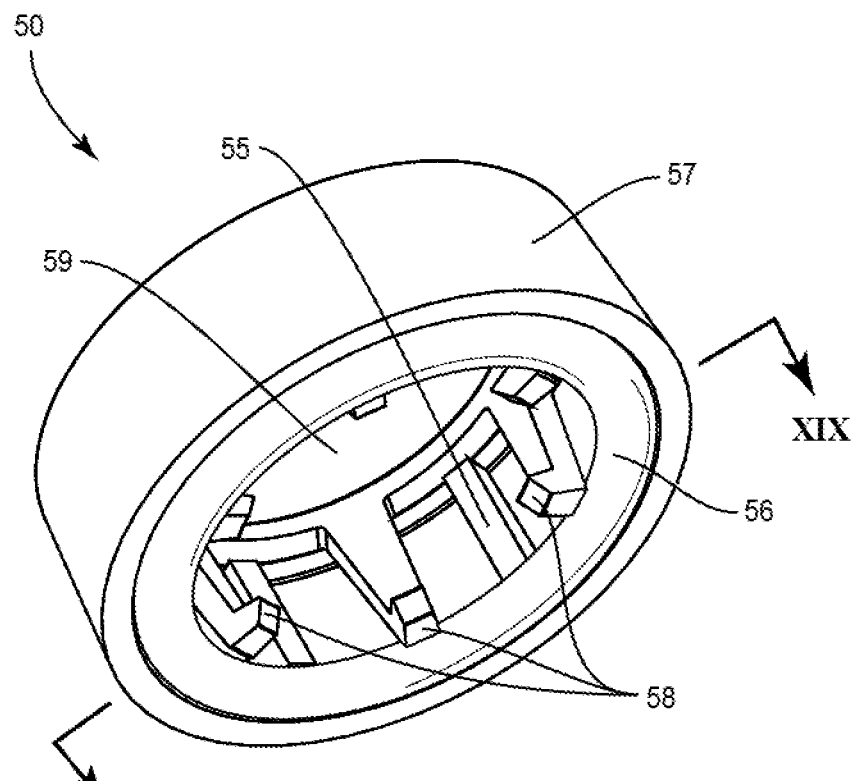

FIG. 18 is a perspective view of a base in accordance with an embodiment.

Figure 19:
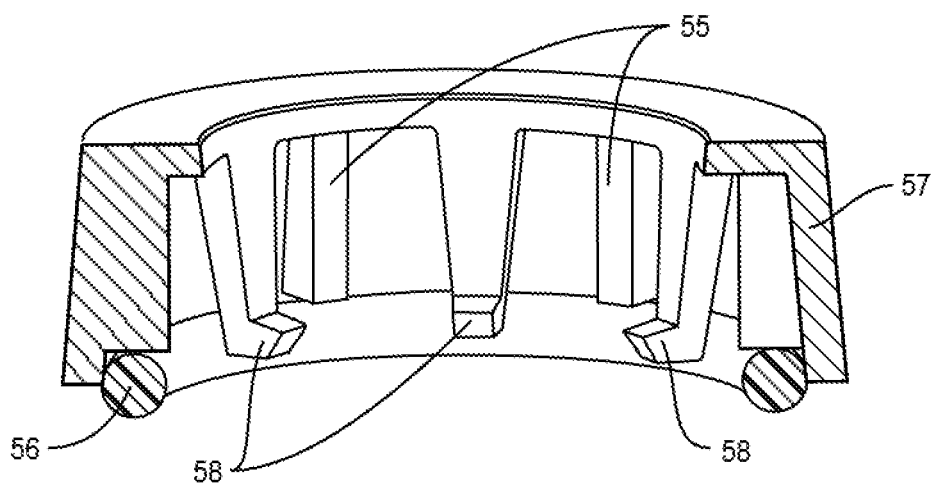

FIG. 19 is a section view cut along line XIX-XIX of FIG. 18.

Figure 20:
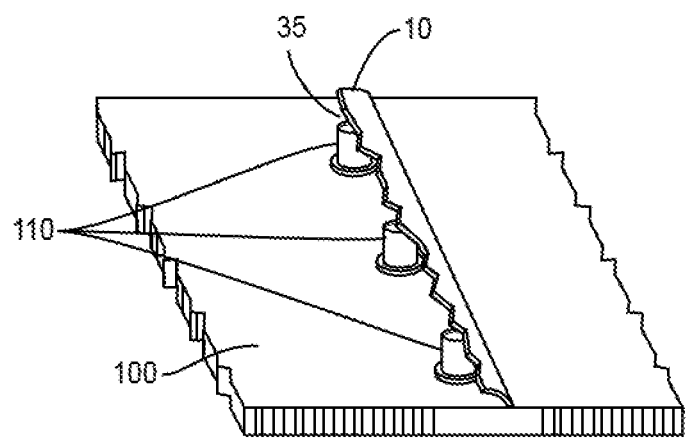

FIG. 20 is a section view of a cover that extends over multiple fasteners in accordance with an embodiment.

DETAILED DESCRIPTION

FIG. 1 schematically illustrates a cover 10 that extends over a fastener 110. The fastener 110 includes a head 113 and a body 119. The body 119 is positioned within the cover 10 and illustrated in dashed lines. As shown, the cover 10 covers the body 119, but in other embodiments, the cover 10 may cover the head 113. The cover 10 forms a cavity 13 that includes an open end 11 that extends around the fastener 110 and a closed end 12 that extends over the fastener 110. The cover 10 shields the fastener 110 from the exterior environment 120. The exterior environment 120 may include combustible components in the air. For example, the exterior environment 120 may be a fuel cell in a wing of an aircraft. The cover 10 includes an outer shell 20 with one or more windows 26. An inner shell 30 is positioned or nested within the outer shell 20. The inner shell 30 includes one or more windows 36 that are offset from the one or more windows 26 of the outer shell 20. One or more flow paths 40 are formed for gas, liquid, and/or some particles to flow through the cover 10 while removing the thermal and/or kinetic energy that may ignite the combustible exterior environment 120. The offset between the windows 26, 36 provides for each of the flow paths 40 to circuitously extend between the interior space 35 of the inner shell 30 to the exterior environment 120.

FIGS. 2A and 2B illustrate a cover 10 that is positioned over a fastener 110. The cover 10 includes an outer shell 20 that shrouds an inner shell 30 (shown in FIG. 2B). One or more windows 26 through the outer shell 20 are offset from one or more windows 36 through the inner shell 30. One or more flow paths 40 extend from an interior space 35 to the exterior environment 120 to allow gas, liquid, and/or particles to flow through the cover 10. The flow paths 40 include a circuitous route. As illustrated in FIG. 2B, a first flow path 40a extends through the window 36 of the inner shell 30, a gap 60a formed between the outer and inner shells 20, 30, and through a window 26a of the outer shell 20. A second flow path 40b extends through the window 36 of the inner shell 30, a gap 60b formed between the outer and inner shells 20, 30, and through a window 26b of the outer shell 20. The cover 10 also includes a base 50 positioned between the open ends 21, 31 of the outer and inner shells 20, 30, respectively, and the member 100. The base 50 supports the inner and outer shells 30, 20.

The fastener 110 extends through a member 100 having a first portion 100a joined to a second member 100b by the fastener 110. The fastener 110 includes a head 113 and a body 119. The fastener 110 may be any suitable fastener such as a threaded fastener (e.g., a bolt or screw), a stud, a pin, a rivet and the like. The fastener 110 may include one or more coupling elements such as a nut 118, a washer 111, a bushing, etc. The fastener 110 includes metal and/or conductive components that could shunt electrical current and/or be associated with electromagnetic effects that may become ignition sources. The fastener 110 may extend through the member 100 or may terminate within the member 100.

The member 100 can include and/or can be an electrical insulator (electrically non-conductive) and/or a poor electrical conductor relative to the fastener 110. The member 100 can also include an electrical conductor such as electrically-conductive filler and/or reinforcement material (e.g., metallic filler and/or carbon fiber), and/or may include an electrically-conductive layer (e.g., metallic film, metal plate, etc.). The member 100 can include, and/or can be constructed of, a polymer (e.g., polyurethane), a composite material (e.g., a carbon fiber-reinforced polymer (CFRP) and/or fiberglass), a ceramic, and/or a metal. The member 100 can be a plate, a sheet, web of material, and/or a larger part of an object (e.g., wing, fuselage).

The cover 10 shrouds the fastener 110 to prevent exposure of the fastener 110 to the environment 120. The environment 120 may include flammable gaseous vapors having a low specific heat of combustion such that ignition may be possible. The cover 10 positions the fastener 110 within the interior space 35 to shroud or cover at least a portion of the fastener 110 such that ignition of the combustible environment that occurs within the interior space 35 does not propagate outside of the cover 10 and does not ignite the combustible exterior environment 120.

The exterior environment 120 can include a combustible substance and/or mixture. For example, combustible exterior environment 120 can include a fuel (e.g., hydrogen, gaseous, liquid, and/or aerosolized hydrocarbon, and/or suspended particulate such as sawdust, etc.), an oxidizer (e.g., oxygen, fluorine, and/or nitrous oxide), and optionally a non-reactive diluent (e.g., nitrogen, argon, and/or helium) with concentrations within the flammability limits of the fuel/oxidizer mixture. As another example, combustible exterior environment 120 can include a gas that undergoes explosive decomposition (e.g., acetylene, nitrous oxide). Additional specific examples of fuels include motor fuels such as automotive fuel, diesel fuel, aviation fuel, and/or jet fuel. Combustible exterior environments 120 can include gases, vapors, aerosols, and/or particulate.

The cover 10 can prevent the ignition of the combustible exterior environment 120 by preventing a hot particle that is emitted from the fastener 110 from travelling through the cover 10. As used herein, the term "hot particle" refers to a particle that is emitted from the fastener 110 due to an ignition source at the fastener 110 that has a size and/or a thermal energy sufficient to cause ignition of the combustible exterior environment 120. The cover 10 is configured such that there are no straight-line trajectories through the cover 10 from the interior space 35 to the exterior environment 120 and no line of sight from the exterior environment 120 to the interior space 35. Designs can also include no line of sight from the exterior environment 120 to the fastener 110 that is located in the interior space 35. Particles traversing the cover 10 along the convoluted (or at least a non-straight) flow paths 40 will collide with one or more of the inner and outer shells 30, 20 and thereby lose at least a portion of their thermal and/or kinetic energy. One design includes the first ends 21, 31 of the inner and outer shells 30, 20 aligned along a plane and the windows 26, 36 positioned to prevent a line of sight from the exterior of the outer shell 20 to the plane.

FIG. 3 illustrates an outer shell 20 that forms the exterior of the cover 10. The outer shell 20 includes a first end 21 and a second end 22. The outer shell 20 can have various thicknesses measured between an inner side 23 and an outer side 24. The thickness can be consistent throughout the outer shell 20, or can vary. One design includes a thickness in a range of between 0.1 mm-10 mm. A more specific design includes a thickness in the range of between 0.5 mm-5 mm. A more specific design includes a thickness in the range between 1 mm-3 mm.

One or more windows 26 extend through the outer shell 20. The windows 26 can include the same or different shapes and/or sizes. FIG. 3 includes an outer shell 20 with four windows 26a, 26b, 26c, 26d on the lateral sides between the open first end 21 and the closed second end 22. FIG. 4 includes an outer shell 20 with three windows 26a, 26b, 26c. The shape and size of window 26a is different from the shape and size of windows 26b, 26c (which are the same). FIG. 5 includes an outer shell 20 with a single window 26.

The windows 26, 36 can extend over various portions of the surface area of the cover 10. The windows 36 of the inner shell 30 can include between 0.1%-90% of a surface area of the inner shell 30. Windows 26 of the outer shell 20 can include between 0.1%-90% of the surface area of the outer shell 20.

FIG. 6 includes an inner shell 30 with a first end 31 and an opposing second end 32. The inner shell 30 extends around and forms an interior space 35 configured to extend over the fastener 110. One or more windows 36 extend through the inner shell 30 between the first and second ends 31, 32. The windows 36 can include the same or different shapes and/or sizes. FIG. 6 includes an inner shell 30 with four windows 36a, 36b, 36c, 36d spaced around the lateral side. Each of the windows 36 includes the same shape and size. FIG. 7 includes an inner shell 30 with a single window 36.

The inner and outer shells 30, 20 can include various shapes and/or sizes. One design includes the outer shell 20 and the inner shell 30 having substantially the same shape with the outer shell 20 being larger to extend over and shroud the inner shell 30. Other designs include the outer shell 20 having a different shape than the inner shell 30 and being sized to extend over and shroud the outer shell 30.

The inner and outer shells 30, 20 may include retaining features 37, 27 to maintain their relative position and/or mate the inner and outer shells 20, 30 together. As illustrated in FIG. 8, the retaining features 37 of the inner shell 30 can include extensions. The retaining features 27 of the outer shell 20 include receptacles. The retaining features 37, 27 mate together to prevent relative movement between the inner and outer shells 30, 20. This maintains the relative positioning of the inner and outer shells 30, 20 and the windows 26, 36.

FIG. 8 includes the retaining features 37, 27 being extensions in the inner shell 30 and receptacles in the outer shell 20. This configuration can be reversed with receptacles on the inner shell 30 and extensions on the outer shell 20. Further, the shapes, sizes, and/or configurations of the retaining features 27, 37 can be intermixed about the inner and outer shells 30, 20.

The inner and outer shells 30, 20 can be constructed from the same or different materials. The materials can include but are not limited to polymers, reinforced polymers, polymer composites, and non-conductive ceramics. Examples of polymers include but are not limited to those that can withstand exposure to jet fuel such as PEEK, nylon, PTFE, polyimide, acetal, PFA, Lytex, Melamine Phenolic, Polybutylene terephthalate, and Torlon. In one design, the material is conducive to form the inner and outer shells 30, 20 through injection molding.

As shown in FIGS. 9 and 10, the inner and outer shells 30, 20 may form one or more gaps 60 therebetween. FIG. 9 includes a first gap 60a that forms a portion of a first flow path 40a (along with window 36a and window 26a). A second gap 60b forms a portion of a second flow path 40b (along with window 36b and window 26b). FIG. 10 includes numerous flow paths 40a-40h that each extends through a window 36 of the inner shell 30, a window 26 of the outer shell 20, a section of one or more gaps 60. The one or more gaps 60 are formed between the inner side 23 of the outer shell 20 and the outer side 34 of the inner shell 30. Designs can include a single gap 60 that extends across the entirety of the inner and outer shells 30, 20. Other designs can include one or more smaller gaps 60 that extend across discrete sections of the inner and outer shells 30, 20.

As illustrated in FIG. 10, the windows 26, 36 are offset such that the flow paths 40a-40h do not extend along a straight line, but rather include a circuitous shape. Each flow path 40 includes a circuitous (i.e., non-straight) shape as the windows 36 of the inner shell 30 are aligned with a solid section of the outer shell 20. Particles traversing the cover 10 along the convoluted (or at least a non-straight) flow paths 40 will collide with one or more of the inner and outer shells 30, 20 and thereby lose at least a portion of their thermal and/or kinetic energy. In the various designs, the one or more flow paths 40 can be configured to prevent line of sight from the exterior environment 120 to the interior space 35 and/or fastener 110 and/or member 100 within the interior space 35.

FIG. 11 illustrates an inner shell 30 with a single window 36 and an outer shell 20 with two windows 26a, 26b. The two windows 26a, 26b are each offset from the window 36. A first flow path 40a extends through the window 36, along a first section of the gap 60, and to and through window 26a. A second flow path 40b extends through the window 36, along a second section of the gap 60, and to and through window 26b.

One or more sections of the inner and outer shells 30, 20 can be in contact. Along these one or more sections, the inner side 23 of the outer shell 20 contacts against the outer side 34 of the inner shell 30. This contact eliminates the gap 60 and prevents flow paths 40 from extending through these one or more sections. To provide for a gap 60, one or more of the inner side 23 and the outer side 34 can include extensions to control the position. FIG. 11 includes a design with the inner shell 30 having extensions 69 that space apart, align, and/or position the outer shell 20. The extensions 69 can also provide a physical barrier between the inner and outer shells 30, 20 to prevent the flow of gases and/or particles along one or more sections of the gap 60. The one or more extensions 69 can direct the gases and/or particles through one or more of the windows 26 of the outer shell 20.

FIG. 12 includes an inner shell 30 with a pair of windows 36a, 36b and an outer shell 20 with a single window 26. A first flow path 40a extends through window 36a, a first section of the gap 60, and the window 26. A second flow path 40b extends through the window 36b, a second section of the gap 60, and the window 26.

FIG. 13 includes an inner shell 30 and an outer shell 20 each with a single window 36, 26. A single flow path 40 extends from the interior space 35, through the window 36, along a section of the gap 60, and through the window 26.

Each flow path 40 includes a hydraulic diameter, $D_H$. The hydraulic diameter $D_H$ is equal to four times the flow area divided by the wetted perimeter at a point along the flow path 40. This is defined below in equation [1]:

$$D_H = 4A/P \quad \text{[Eq. 1]}$$

A=the cross-sectional area of the flow path
P=the perimeter of the cross-section of the flow path.
The flow area can include the smallest sectional area along the flow path 40. This can include the section of the gap 60 along which the flow path 40 extends. This can also be located at one or more of the windows 26, 36. One design includes a hydraulic diameter $D_H$ in a range of between 0.1 mm-2 mm. A more specific design includes a hydraulic diameter $D_H$ in the range of between 0.1 mm-1.5 mm. A more specific design includes a hydraulic diameter $D_H$ in the range of between 0.5 mm-1.2 mm.

The flow path 40 includes separate sections including the flow through the inner shell 30, the flow through the gap 60, and the flow through the outer shell 20. The limiting hydraulic diameter $D_H$ can be in one or more of these different sections. One design includes the limiting hydraulic diameter $D_H$ being in just one section.

The one or more flow paths 40 can be sized and configured to allow drainage of fluid. This prevents trapped fluid pockets within the interior space 35 and/or the one or more gaps 60.

The base 50 is configured to support the inner and outer shells 30, 20. For example, and as shown schematically in FIGS. 2A and 2B, the base 50 forms a ring that supports the inner and outer shells 30, 20 and extends around the fastener 110. The base can be porous or can be non-porous.

The base 50 can be coupled to one or both of the inner and outer shells 30, 20 in various manners, including but not limited to bonding, fusing, welding, heat staking, and adhesive bonding. For example, one or both of the inner and outer shells 30, 20 can be coupled to the base 50 by adhesive such as epoxy, cyanoacrylate, polyurethane, polysulfide, etc. As another example, one or both of the inner and outer shells 30, 20 can be coupled to the base 50 by sintering, welding, etc. (e.g., hot gas welding, polymer welding rod, hot plate welding, contact welding, high frequency welding, induction welding, friction welding, spin welding, laser welding, ultrasonic welding, and/or solvent welding). As yet another example, one or both of the inner and outer shells 30, 20 and the base 50 can have snap-fit features that engage together.

The base 50 can include, or can be formed entirely of, materials similar to or the same as the inner and outer shells 30, 20. The base 50 may include and/or be formed of a polymer, a ceramic, a glass, a metal, a non-metal, a composite material, or combinations thereof. Examples of polymers include but are not limited to those that can withstand exposure to jet fuel such as PEEK, nylon, PTFE, polyimide, acetal, PFA, Lytex, Melamine Phenolic, Polybutylene terephthalate, and Torlon. In one design, the base 50 can be constructed from metallic components, such as but not limited to aluminum, titanium, steel.

The base 50 can be attached to the fastener 110. The attachment can include one or more elements that extend from the base 50 and connect with the fastener 110, one or more elements that extend from the fastener 110 and connect with the base 50, and combinations thereof. Additionally or alternatively, the attachment can include an adhesive. Further, the adhesive can connect the base 50 to the member 100. Various adhesives can be used for the attachment, such as but not limited to polysulfide.

FIG. 14 illustrates a cover 10 that includes the inner and outer shells 30, 20 and the base 50. FIG. 15 shows the base 50 having a generally annular shape with a central opening 59. When the base 50 is attached to the inner and outer shells 30, 20, the opening 59 aligns with the interior space 35 of the inner shell 30. Retention features extend around the central opening 59 to engage with the fastener 110. The retention features each include an entry slot 51, a retaining cantilever 52, and a retention slot 53.

FIG. 16 illustrates a fastener 110 engaged with the base 50. The fastener 110 includes a body 119 with threads that engage with a nut 118. A washer 111 extends around the body 119 and includes tabs 112. The tabs 112 and the entry slots 51 are configured to fit together such that the cover 10 can be applied over the fastener 110 after the fastener 110 is installed in the member 100. The entry slots 51 extend to the retaining cantilevers 52 and then to the retention slots 53. The retaining cantilevers 52 are configured to guide the tabs 112 from the entry slots 51 to the retention slots 53. The tabs 112 and/or the retaining cantilevers 52 can be flexible and/or coupled to the respective structure with a flexible arm. The cover 10 can be installed with the tabs 112 in the entry slots 51. A twist of the cover 10 causes the tabs 112 to be driven up the retaining cantilevers 52 until the tabs 112 clear the retaining cantilevers 52. Once the tabs 112 clear the retaining cantilevers 52, the tabs 112 can snap into the retention slots 53 and/or the retaining cantilevers 52 can snap into place to hold the tabs 112 in the retention slots 53. The tabs 112 and/or the retaining cantilevers 52 can make an audible click as the tabs 112 are retained in the retention slots 53 (e.g., to indicate proper installation).

FIGS. 14-16 illustrates four tabs 112, and four corresponding attachment features on the base 50. Other designs can include different numbers of tabs 112 and attachment features. Also, this design includes the tabs 112 being a portion of the washer 111. However, the tabs 112 can be coupled to or an integral portion of any of the components of the fastener 110 such as the washer 111, the nut 118, and the body 119.

FIG. 17 illustrates a cover 10 shrouding the fastener 110 and being coupled by a push-style snap lock coupling. The base 50 includes one or more rims 54 and the fastener 110 includes one or more shoulders 117. The shoulder 117 is a surface that engages the rim 54 and entraps the rim 54 between the shoulder 117 and the member 100. The rim 54 can be a continuous annular rim (spanning the entire inner circumference of the cover 10) or can be one or more rims 54 arranged around the inner circumference of the cover 10. The rims 54 can be substantially uniformly distributed or asymmetrically distributed about the inner circumference of the cover 10.

The shoulder 117 can be formed by a combination of two washers 111a, 111b. The underside of the upper washer 111a forms the shoulder 117 in the recess formed by the lower washer 111b between the upper washer 111a and the member 100. In the example of FIG. 17, the rim 54 is formed at the edge of the cover 10 as an annular protrusion. The rim 54 is configured to flex as the cover 10 is pushed down to the member 100. When the rim 54 is pushed past the shoulder 117, the rim 54 relaxes into the position shown in FIG. 17 in which the rim 54 is entrapped between the shoulder 117 and the member 100.

FIGS. 18 and 19 illustrate another base 50. Base 50 includes a body 57 with an annular shape with an enclosed central opening 59. Cantilevered legs 58 extend outward from an inner side of the body 57 towards the central opening 59. The ends of the legs 58 can be radially spaced inward from the inner side of the body 57. Pegs 55 can also be positioned along the inner side of the body 57. A gasket 56 can be positioned between the legs 58 and the inner side of the body 57. The gasket 56 is further positioned between ends of the pegs 55 and the bottom edge of the body 57. The gasket 56 can conform the base 50 to the member 100 which can have an uneven shape. In one use, the composite structure of a member 100 in an aircraft is typically not smooth and can contain other irregularities. The gasket 56 can accommodate the irregularities and prevent a flow path into the interior space 35 that has a greater hydraulic diameter $H_D$ than allowed given the mixture and ignition source. The gasket 56 can also provide a line of sight trajectory for hot particles. The gasket 56 includes an annular shape and extends around the base 50. The gasket 56 can be constructed from various materials, including but not limited to nitrile rubber and fluorosilicone rubber. The gasket 56 can include the same or different thicknesses as different locations.

The cover 10 can be sized to enclose multiple fasteners 110 as illustrated in FIG. 20. The fasteners 110 can be arranged as a row, a circle, an array, a cluster, etc. The cover 10 can include a single interior space 35 that is sized to extend over each of the fasteners 110. The cover 10 can include two or more separate interior spaces 35 that each are sized to extend over one or more fasteners 110. The different interior spaces 35 can be separated by one or more walls. The cover 10 is further configured to connect to each of the multiple fasteners 110.

The cover 10 is positioned on the member 100. In one design as illustrated in FIG. 9, the cover 10 is formed by the inner and outer shells 30, 20. The first ends 31, 21 of the inner and outer shells 30, 20 can be aligned along a common plane P that contacts against the member 100. Other designs include the cover 10 having a base 50 that is positioned between the inner and outer shells 30, 20 and the member 100. The bottom edge of the base 50 contacts against the member 100. In some designs, there is a spacing between the cover 10 and the member 100. The spacing can be at least partially filled with a spacer (e.g., an O-ring, a gasket) and/or an adhesive (e.g., epoxy, cyanoacrylate, polyurethane, polysulfide, etc.). Unfilled regions of the spacing are sized and/or arranged to prevent a nascent flame front and/or a hot particle from propagating around the cover 10 (through the spacing) and potentially igniting the exterior environment 120. For example, the unfilled regions of the spacing can have dimensions smaller than the quenching distance, or related parameter, of the combustible environment 130. The maximum distance between the cover 10 and the member 100 that is not filled (i.e., unfilled regions of the spacing) can be less than 1 mm, less than 0.8 mm, or less than 0.5 mm.

The cover 10 can be used in a variety of different contexts. One use includes on a fuel tank, such as a wing fuel tank in a composite wing aircraft. The fastener 110 can be exposed to the fuel volume and/or ullage space (e.g., extending into the interior of the fuel tank) and embedded in and/or coupling one or more members 100 which contact the fuel volume and/or ullage space. The members 100 can be carbon-fiber composite panels, partitions, stringers, etc. that are in the interior of the fuel tank and/or define at least a portion of the interior of the fuel tank. The cover 10 covers the fastener 110 and is collocated with the fastener 110. An ignition source associated with the fastener 110 can develop and trigger an ignition event at the fastener 110. For example, due to, e.g., a lightning strike or the friction of fuel movement, electrical charge and/or an electrical voltage may develop at the fastener 110 sufficient to cause an electrical discharge or other potential ignition source. The ignition event includes an ignition kernel, a nascent flame front, and/or a pressure wave within the interior space 35 of the cover 10. The ignition kernel is quenched by the cover 10; the nascent flame front is quenched as it traverses the cover 10; and/or the pressure wave can be dissipated and/or impeded by the cover 10.

The cover 10 can be used in a variety of different contexts. One context includes use on an aircraft fuel tank. The cover 10 can be useful in other applications requiring ignition hazard consideration, including fuel transport, fuel storage, mining operations, chemical processing, metal fabrication, power plant construction and operation, and operations which involve combustible particulate such as suspended dust, sawdust, coal, metal, flour, and/or grain.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A cover comprising:
   an inner shell comprising a first end that is open, a second end, and an interior space sized to extend over a fastener, the inner shell having a window open to the interior space and positioned between the first end and the second end;
   an outer shell that shrouds the inner shell, the outer shell comprising a first end that is open and a second end, the outer shell further comprising a window positioned between the open end and the second end, the window of the outer shell being aligned away from the window of the inner shell to prevent a line of sight from an exterior of the outer shell to the interior space of the inner shell;
   a gap between the inner shell and the outer shell; and
   a flow path that extends between the interior space of the inner shell and the exterior of the outer shell, the flow path extending to and through the window of the inner shell, the window of the outer shell, and the gap.

2. The cover of claim 1, wherein the outer shell comprises an inner side that faces towards the gap and the inner shell comprises an outer side that faces towards the gap, the outer shell comprising a larger inner width and the inner shell comprising a smaller outer width with the gap formed between the outer side and the inner side.

3. The cover of claim 1, wherein the outer shell comprises an inner side that faces towards the inner shell and the inner shell comprises an outer side that faces towards the outer shell, the inner side and the outer side being in contact along one or more sections of the cover away from the gap.

4. The cover of claim 1, wherein the window of the inner shell is a first window of the inner shell and the window of the outer shell is a first window of the outer shell, the cover further comprising a second window that extends through the inner shell and a second window that extends through the outer shell, each of the first and second windows of the outer shell being offset from each of the first and second windows of the inner shell to prevent a line of sight from the exterior of the outer shell to the interior space of the inner shell.

5. The cover of claim 4, wherein the first and second windows of the inner shell comprises between 0.1%-90% of a surface area of the inner shell and the first and second windows of the outer shell comprises between 0.1%-90% of the surface area of the outer shell.

6. The cover of claim 1, wherein each of the first ends of the inner shell and the outer shell are aligned on a contact plane, and wherein the window of the outer shell is positioned away from the window of the inner shell to prevent a line of sight from the exterior of the outer shell to the contact plane.

7. The cover of claim 1, further comprising an extension that extends from one of the inner shell or the outer shell, and further comprising a receptacle that is positioned in the other of the inner shell or the outer shell, the extension engaged with the receptacle to prevent rotation and translation of the inner shell relative to the outer shell.

8. The cover of claim 1, wherein the cover is attached to the fastener to secure the cover to the fastener.

9. The cover of claim 1, further comprising a base attached to the inner shell and to the outer shell, and a gasket positioned at an end of the base with the gasket configured to conform between the base and a member.

10. The cover of claim 9, wherein the interior space of the inner shell is sized to extend over two or more of the fasteners.

11. The cover of claim 10, wherein the cover is mounted in a fuel cell of an aircraft and configured to quench an ignition event in the fuel cell triggered by an ignition source associated with a fastener.

12. The cover of claim 10, further comprising a retaining feature in each of the inner shell and the outer shell, the retaining features being engaged together to prevent rotation of the inner shell relative to the outer shell about a longitudinal axis of the cover.

13. A cover comprising:
an inner shell and an outer shell that are nested together in an overlapping arrangement that includes an open end and a closed end, each of the inner shell and the outer shell comprising:
a first end that is open;
an interior space;
at least one window in communication with the respective interior space; and
a second end that opposes the respective first end;
one or more gaps between the outer shell and the inner shell;
at least one flow path that extends outward from the interior space within the inner shell to an exterior of the outer shell, the at least one flow path extending through at least one of the windows of the inner shell, at least one of the windows of the outer shell, and one of the one or more gaps that extend between the windows;
the at least one window of the inner shell is offset from the at least one window of the outer shell to prevent a line of sight from an exterior of the outer shell to the interior space within the inner shell.

14. The cover of claim 13, wherein each of the at least one flow paths comprises at least one section with a hydraulic diameter that is between 0.1 mm-2.0 mm.

15. The cover of claim 13, wherein each of the inner shell and the outer shell comprise two or more windows and the cover comprises a plurality of flow paths with each of the flow paths extending from a different one of the windows of the inner shell, a different one of the windows of the outer shell, and a different one of the gaps.

16. A method of installing a cover over a fastener, the method comprising:
positioning a cover over a fastener that extends from a member with the fastener positioned in an interior space of an inner shell and with an outer shell extending over the inner shell and with the inner and outer shells mated together to prevent relative movement;
aligning the cover over the fastener with a window through the outer shell being misaligned with a window of the inner shell and preventing line of sight from an exterior on the outer shell to the interior space of the inner shell and the fastener from being visible from the exterior of the outer shell, the window of the inner shell is positioned between first and second ends of the inner shell and the window of the outer shell is positioned between first and second ends of the outer shell; and
forming a flow path that extends from the interior space of the inner shell to the exterior of the outer shell with the flow path extending through the window of the inner shell, along a gap formed between the inner shell and the outer shell, and through the window of the outer shell.

17. The method of claim 16, further comprising the flow path having at least one section with a hydraulic diameter between 0.1 mm-2.0 mm.

18. The method of claim 16, further comprising connecting a base of the cover to the fastener.

19. The method of claim 18, further comprising positioning the cover over a second one of the fasteners.

20. The method of claim 16, further comprising attaching the inner shell to the outer shell and preventing movement of the inner shell relative to the outer shell.

* * * * *